United States Patent [19]

Mongeon et al.

[11] Patent Number: 4,592,058
[45] Date of Patent: May 27, 1986

[54] FREQUENCY STABILIZED LASER

[75] Inventors: Robert J. Mongeon, S. Windsor; Robert W. Henschke, East Hampton, both of Conn.

[73] Assignee: The United States of America as represented by the Secretary of the Army, Washington, D.C.

[21] Appl. No.: 639,558

[22] Filed: Aug. 10, 1984

[51] Int. Cl.$^4$ .............................................. H01S 3/13
[52] U.S. Cl. ...................................... 372/32; 372/38; 372/28; 372/20
[58] Field of Search ...................... 372/29, 32, 26, 28, 372/20, 38, 34

[56] References Cited

U.S. PATENT DOCUMENTS

| | | | |
|---|---|---|---|
| 3,471,803 | 10/1969 | Forster | 372/29 |
| 3,496,488 | 2/1970 | Fork et al. | 372/29 |
| 3,534,292 | 10/1970 | Cutler | 372/32 |
| 3,686,585 | 8/1972 | Javan et al. | 372/32 |
| 3,793,595 | 2/1974 | Russo et al. | 372/32 |
| 4,103,254 | 7/1978 | Chikami | 372/32 |
| 4,150,342 | 4/1979 | Johnston, Jr. et al. | 372/20 |
| 4,319,203 | 3/1982 | Brosio et al. | 372/30 |
| 4,509,132 | 4/1985 | Kavaya | 372/32 |

OTHER PUBLICATIONS

Tomlinson et al.; "Frequency Stabilization of a Gas Laser"; *Appl. Opt.* vol. 8, No. 1, Jan. '69, p. 121.
Avtonomov et al.; "Poss. Stabilization of the Freq. of a CO$_2$-Laser Using an Ext. Stark Cell Containing 1-1 Difluoroethane"; *Sov. JQE* 9(2), Feb. '79.
Siio et al.; "Freq. Stab. of a He-Xe Laser Using a Stark-Spect. in H$_2$CO"; *Japn. Jour. Appl. Phys.*, vol. 20, No. 7, Jul. '81, p. L508.
"Simult. Freq. Stab. and Injection in a TEA-CO$_2$ Oscillator", Lachambre et al.; *Appl. Opt.*, vol. 17, No. 7, Apr. 1, 1978, p. 1015.
Smith; "Stabilized Single-Freq. Output from a Long Ring Laser"; *IEEE J.Q.E.*, Aug. 1968, p. 485.
Layer; "A Portable Iodine Stabilized Helium-Neon Laser"; *IEEE Transt. on Inst. and Measu.*, vol. 1M-29, No. 4, Dec. 1980.

*Primary Examiner*—Léon Scott, Jr.
*Attorney, Agent, or Firm*—Anthony T. Lane; Sheldon Kanars; Edward Goldberg

[57] ABSTRACT

A frequency control system for a laser for compensating for thermally-induced laser resonator length changes. The frequency control loop comprises a frequency reference for producing an error signal and electrical means to move a length-controlling transducer in response thereto. The transducer has one of the laser mirrors attached thereto. The effective travel of the transducer is multiplied severalfold by circuitry for sensing when the transducer is running out of extension and in response thereto rapidly moving the transducer and its attached mirror toward its midrange position.

6 Claims, 2 Drawing Figures

FREQUENCY STABILIZED LASER

The Government has rights in this invention pursuant to contract DAAB07-76-C-0920, awarded by the Dept. of the Army.

BACKGROUND OF THE INVENTION

Lasers, especially those used in tactical military equipment, are subject to a wide range of ambient temperatures which can adversely affect their operation. Optimum laser operation and power output require that the laser resonator or cavity have a length or spacing between the mirrors thereof which is an integral number of half wavelengths of the operating frequency. Since laser resonators are often as much as 50 cm. in length, a resonator which is not temperature compensated will expand through numerous half wavelengths for each 1° C. temperature rise, even at the longer infra red wavelengths.

One solution to this problem has been to provide a thermally compensated resonator structure so that the resonator length remains constant regardless of temperature changes caused either by heat generated by the laser itself or due to ambient temperature effects. Such a resonator is much more expensive, heavier and less rigid than one which is not thermally compensated.

The approach of the present invention involves using a nonthermally compensated conventional laser resonator, with its simplicity, rigidity and other advantages, and to provide a special frequency control system for the laser which permits continuous operation during warmup despite the fact that the laser cavity is scanning or expanding through a large number of longitudinal orders during this time. The frequency control system includes a resonator length-controlling transducer to which one of the laser mirrors is attached. An electrical signal applied to the transducer will thus move the mirror to compensate for thermally induced resonator length changes.

Transducers for such applications normally have a maximum extension of approximately 15 microns which is only about 1½ wavelengths of the output of a $CO_2$ laser. Thus such a transducer would normally only be capable of compensating for 15 microns of resonator length change, but, as stated above, a long thermally uncompensated resonator might expand more than this for a 1 degree temperature rise. The present invention provides a feedback frequency control system which automatically senses when the transducer and its attached mirror are running out of extension and in response thereto automatically switches the transducer to another mode or order which is near the mid-range of the transducer's extension. This effectively extends the transducer's length severalfold. This mode transition simply involves rapidly moving the transducer and mirror a distance equal to an integral multiple of a half wavelength of the operating frequency. Since ceramic peizoelectric tranducers (PZT) as well as magnetic transducers of the magnetostriction type have hysteresis and and non-linearities which are both small and repeatable, it has been found experimentally that the delta voltage required to re-step the transducer by one order (or one half a wavelength) varies less than 2% over a wide range. This variation is known as the mode transition error, and it will cause a small temporary frequency error in the laser output which will be corrected by the frequency control system within a millisecond or so.

The plus and minus delta voltages are inserted in the frequency control loop at a point after the low pass filter therein which determines the control loop frequency response, and thus the delta voltage will be applied to the transducer to accomplish the mode transition before the frequency control loop can respond thereto.

SUMMARY OF THE INVENTION

The apparatus and circuitry comprises a laser including a pair of mirrors to define a cavity therebetween, with one of the mirrors being the output mirror and the other a moveable mirror attached to a length-controlling transducer. The laser frequency and power output are optimized by means of a more or less conventional frequency control servo loop comprising a modulated Stark cell which functions as a frequency reference and to which a sample of the laser output is applied. The output of a synchronous demodulator comprises the error signal of the loop which has an amplitude and polarity which depends on the sense and magnitude of the frequency difference between the Stark cell tuning and the laser output. This error signal is amplified and applied to the transducer to move the mirror attached thereto in such a direction as to minimize the laser tuning error. A novel feature of the circuit comprises circuitry including a pair of sensor circuits connected to the electrical input of the length-controlling transducer to sense when the transducer is running out of extension at either end of its travel. The novel circuitry also comprises means to generate either a positive or negative delta pulse of short duration which is inserted into the aforementioned frequency control loop in such a way that the transducer will be rapidly stepped to a new position near its midrange of extension and which new position differs from the old position by an integral number of longitudinal modes, or an integral number of half wavelengths of the laser frequency. The servo loop will then continue to make smaller adjustments in the mirror position around this new position. This circuitry effectively multiplies the transducer extension manyfold to accommodate large thermally-induced dimensional changes in the laser resonator cavity, which can be many times the maximum extension of the length-controlling transducer.

It is thus an object of this invention to provide a frequency control system for a laser which system includes a moveable laser mirror activated by a transducer, in which the system is provided with an automatic mode transitioning feature wherein the laser is rapidly moved to a new mode or order when the transducer is approaching either the low or high limit of its extension.

Another object of the invention is to provide a temperature compensation circuit for a laser which utilizes a non-thermally compensated laser resonator structure and provides temperature compensation by means of a novel frequency control circuit.

These and other objects and advantages of the invention will become apparent from the following detailed description and the drawings.

DETAILED DESCRIPTION OF A PREFERRED EMBODIMENT

Figure 1:
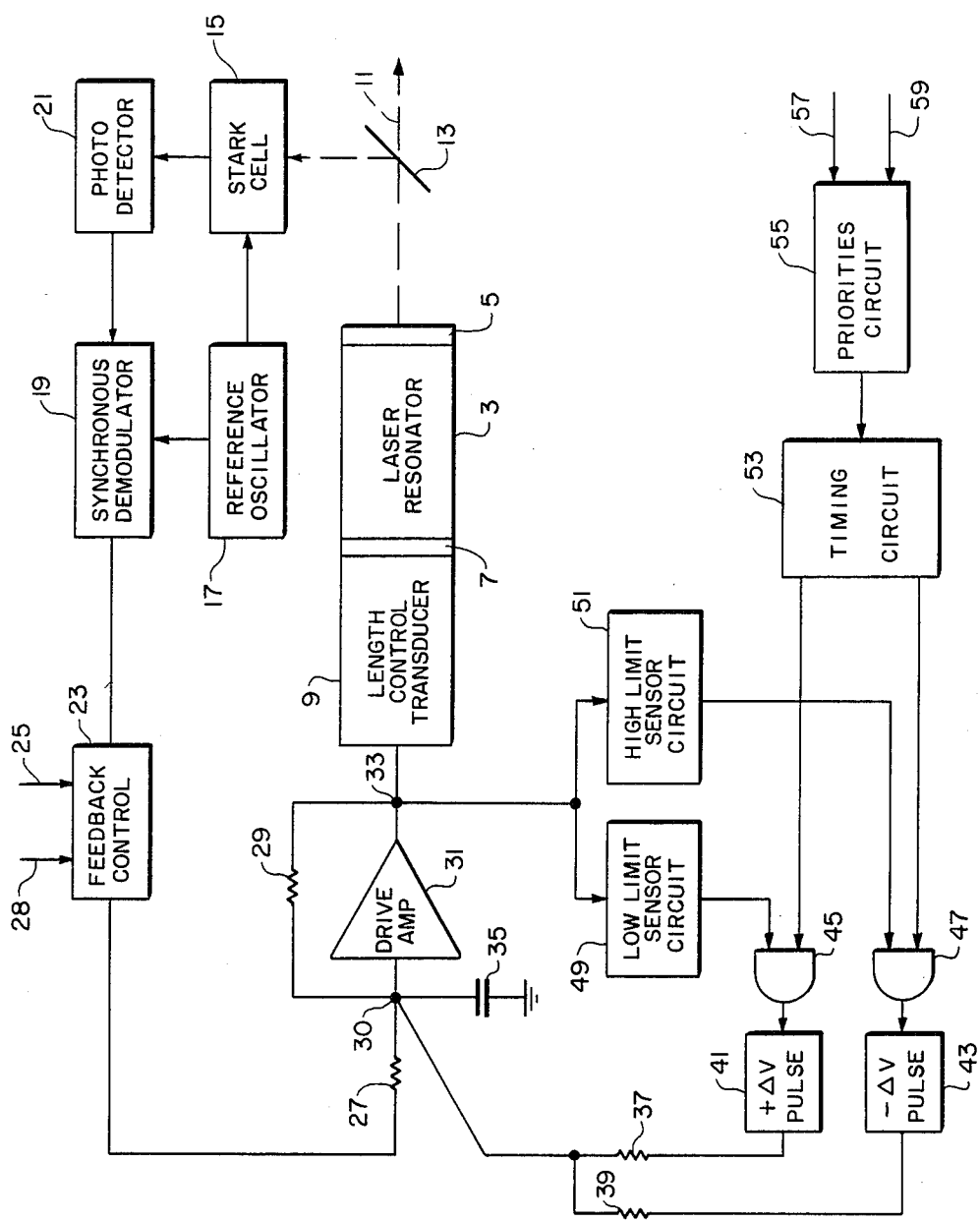
FIG. 1 is a block diagram of one system embodying the present invention.

In the block diagram of FIG. 1 is shown a simplified laser resonator 3 comprising a pair of mirrors 5 and 7. The mirror 5 is only partially reflective and it constitutes the output mirror through which the laser output 11 passes. The other mirror 7 is attached to moveable length-controlling transducer 9, which may be for example, a ceramic piezoelectric transducer, known as a PZT, or a magnetic transducer.

The frequency control loop for the laser comprises a Stark cell 15 to which a portion of the laser output is applied by means of a partially reflective mirror 13 which reflects a small portion of the laser output to the Stark cell. The Stark cell is a frequency reference which has its resonant frequency equal to the desired laser output frequency. A reference oscillator 17 is connected to the Stark cell to vary its resonant frequency around the desired frequency. The modulated light output of the Stark cell is applied to photodetector 21 which converts the light to a correspondingly varying electrical signal which is applied to synchronous demodulator 19. The output of photodetector 21 will be a sinusoidal signal at the frequency of oscillator 17 which has a phase which depends on the sense of the frequency error between the Stark cell tuning and the laser tuning, and an amplitude dependent on the magnitude of the frequency error. The synchronous demodulator has as its reference input the output of the reference oscillator 17 and thus the demodulator output will be a dc voltage with a polarity dependent on the sense of the aforementioned frequency error and a magnitude porportional to the magnitude thereof. This error signal is then passed through a feedback control circuit 23 which has a pair of control inputs 25 and 28 which may be used for performing control functions, such as switching the feedback loop on and off. The error signal from the feedback control circuit 23 is then applied to transducer drive amplifier 31 which has its output connected to terminal 33 which is applied to transducer 9. The amplifier 31 produces sufficient voltage and power to actuate the transducer and its attached mirror 7. A low pass filter comprising series resistor 27 and shunt capacitor 35 is inserted in the feedback loop at the input of amplifier 31. The amplifier 31 has a feedback resistor 29 connected from its output to its input 30. In accordance with well known servo loop design principles, the cut off frequency of the servo loop is made substantially lower than the resonant frequency of the transducer 9 and its attached mirror 7. The servo loop cut off frequency is the cut off frequency of the low pass filter times the open loop servo gain. For example if the transducer-mirror system has a resonant frequency of 5.0 kHz, the servo loop cutoff frequency may be made one fifth thereof or 1.0 kHz, to prevent the system from oscillating. Thus in this example the low pass filter comprising resistor 27 and capacitor 35 would have a cut off frequency of 1.0 kHz divided by the open loop servo gain. With such a feedback system the laser frequency errors require a response time of approximately one millisecond to correct, since the error signal must charge up the capacitor 35 before any error signal output is applied to the transducer.

The frequency control system described so far is conventional. Novel circuitry is added thereto for sensing when the length control transducer reaches the limit of its travel and, in response thereto inserting either a positive or negative delta voltage pulse into the feedback loop's low pass filter to accomplish a mode transition whereby the transducer is rapidly moved by an integral number of laser half wavelengths away from its limit of travel toward the mid-range of its travel. The duration of the delta pulse is made substantially less than the aforementioned response time of the frequency control loop determined by the servo loop cut off frequency. In the absence of any mode transitioning error, the laser frequency at the end of the transition time would be unchanged by this mirror movement, since its round trip dimension would be changed by an integral number of laser wavelengths, however as a practical matter, transducer non-linearities and also hysteresis will cause certain mode transition errors, as explained above. After the delta pulse voltage is removed, these mode transitioning errors will leave the frequency control loop with an error which will be corrected by the usual servo loop action within one millisecond for a loop of the type described.

This novel added circuitry comprises a low limit sensor circuit 49 and a high limit sensor circuit 51, both connected to the point 33 which is the drive amplifier output and the input of transducer 9. The low limit sensor may include a comparator circuit which may comprise, for example, a voltage reference which continuously senses and compares the voltage at point 33 to the voltage reference and produces an output which is applied to AND gate 45 if the voltage reaches a value indicating that the transducer 9 is at or near the low limit of its travel. Similarly, the high limit sensor circuit 51 produces an output which is applied to AND gate 47 if the voltage reaches a value indicating that the transducer is near the high limit of its travel. The AND gate 45 is connected to positive delta voltage pulse generator 41 and AND 47 has its output connected to negative delta voltage pulse generator 43. An output from the AND gate 45 will initiate the generation of a brief positive pulse from circuit 41 which is applied to the drive amplifier input 30 via resistor 37, and similarly an output from the AND gate 47 will produce a negative voltage pulse from circuit 43 which is also applied to drive amplifier input 30 via another resistor 39. The magnitudes of these voltage pulses is selected to produce movement of the transducer 9 and its mirror by an amount to produce the desired mode transistion.

Since the positive and negative delta voltage pulses are applied to the frequency control servo loop beyond the low pass filter formed by the resistor 27 and capacitor 35, these pulses can rapidly scan the laser resonator through numerous longitudinal order or modes without having the relatively slow-responding servo loop attempt to control the laser frequency. However, as stated above, after the short delta pulses disappear, the servo loop will be almost in balance save for the small mode transitioning errors, and the normal servo loop feedback mechanism can correct these errors. As a practical matter the duration of the delta voltage pulses should be approximately one tenth the reciprocal of the cut off frequency of the servo control loop. Thus in the illustrative example with a cut off frequency of 1.0 kHz, the delta voltage pulses would be 0.1 millisecond in duration, thus assuring that the servo loop would not respond directly thereto.

The second input of each of the AND gates 45 and 47 are the outputs of the timing circuit 53 which is controlled by priorities circuit 55 in response to control signals applied thereto from leads 57 and 59. Thus the delta pulses will not be generated unless an enabling pulse from circuit 53 is present at the AND gates. In certain situation it is necessary to temporarily inhibit the function of the mode transitioning circuitry described, and the timing circuit 53 and the associated circuitry provide this feature.

Figure 2:
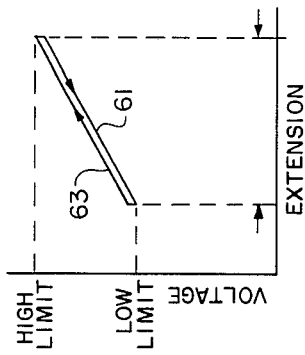
FIG. 2 is a graph showing the characteristics of an illustrative transducer.

The diagram of FIG. 2 illustrates the voltage vs. extension characteristic of a certain ceramic piezoelectric crystal. As can be seen, as the applied voltage increases from the low limit to the high limit the crystal expands along the path 63, but when the voltage is lowered, hysteresis causes the curve to follow the lower path 61.

While the invention has been described in connection with illustrative embodiments, obvious variation therein will be apparent to those skilled in this art, accordingly the invention should be limited only by the scope of the appended claims.

We claim:

1. A frequency stabilized laser comprising a resonator having a given optical output frequency, said resonator comprising a pair of opposing end mirrors which define a laser cavity having a length which varies with temperature, one of said mirrors being the output mirror and the other a moveable mirror, a cavity length-controlling transducer attached to said moveable mirror and having a predetermined travel limit, a frequency control servo loop including means providing a frequency reference, means applying a sample of the output of said laser to said frequency reference means, said frequency reference means providing an optical error signal, means for converting said optical error signal to an electrical signal, a low pass filter having a cutoff frequency much lower than the resonant frequency of said transducer and attached mirror, means applying said electrical signal to said low pass filter, a drive amplifier receiving the output of said low pass filter and applying an amplified output to said transducer to vary the spacing between said mirrors in such a direction as to reduce said error signal toward zero, said frequency control servo loop including high and low limit sensor circuits both connected to said transducer, said low limit sensor circuit providing a first output signal when said transducer approaches the lower limit of its travel, and means connected to said low limit sensor to generate a positive voltage pulse in response to said first output signal, said high limit sensor circuit providing a second output signal when said transducer approaches the upper limit of its travel, and means connected to said high limit sensor to generate a negative voltage pulse in response to said second output signal, and means to apply said positive and negative voltage pulses to the input of said drive amplifier, said voltage pulses having amplitudes sufficient to rapidly move said transducer by an integral member of half wavelengths of said optical output frequency toward the midrange of its travel, and wherein the duration of said voltage pulses is much lower than the reciprocal of the cut off frequency of said servo control loop.

2. The laser of claim 1 wherein said frequency reference means includes a Stark cell, and a reference oscillator modulating said cell, said means for converting said optical error signal being a photodetector, and a synchronous demodulator receiving the output of said photodetector and output from said reference oscillator, said error signal being the output of said synchronous demodulator.

3. The laser of claim 1 wherein said transducer is a ceramic piezoelectric device and wherein said low pass filter has a cut off frequency of approximately one fifth the resonant frequency of said transducer and said voltage pulses have durations of approximately one tenth the reciprocal of the cut off frequency of said servo control loop.

4. The laser of claim 1 including tuning means and gating means controlling said means generating positive and negative voltage pulses.

5. A laser system including a resonator cavity having a predetermined operating frequency and having thermally induced variations in length comprising a pair of mirrors at opposite ends, one mirror being an output mirror and the other a moveable mirror, a cavity length-control transducer secured to said moveable mirror and having a predetermined travel limit, a frequency control servo loop including output signal means coupled to said output mirror and a frequency reference means coupled to said output signal means, said servo loop providing a frequency error signal, said servo loop including a low pass filter having a given cut off frequency, an amplifier connected between said low pass filter and transducer, said frequency error signal being applied to said low pass filter, high and low limit sensor circuits connected to said transducer for respectively sensing when said transducer is approaching the high and low limits of its travel, circuit means responsive to said high limit sensor circuit to produce a negative voltage pulse, and circuit means responsive to said low limit sensor circuit to produce a positive voltage pulse, said voltage pulses being applied to the input of said amplifier to rapidly move said transducer by an integral number of half wavelengths of said laser operating frequency to a point near the midrange of the travel of said transducer.

6. The laser system of claim 5 wherein said voltage pulses have durations of approximately one tenth the reciprocal of the cut off frequency of said servo loop.

* * * * *